United States Patent [19]

Zentmeyer, Jr.

[11] 4,215,284

[45] Jul. 29, 1980

[54] POLE-SHOE MAGNET GROUP FOR MAGNETOMOTIVE DEVICE

[75] Inventor: Richard B. Zentmeyer, Jr., Westfield, Mass.

[73] Assignee: R. E. Phelon Company, Inc., East Longmeadow, Mass.

[21] Appl. No.: 951,972

[22] Filed: Oct. 16, 1978

[51] Int. Cl.[2] .......................... H02K 11/00; F02P 3/08

[52] U.S. Cl. .................................... 310/70 A; 123/599

[58] Field of Search .................... 310/70 R, 70 A, 156, 310/193, 153; 123/148 E, 148 CC, 148 CA, 148 CB, 149 D, 149 F; 315/209 CD, 218

[56] References Cited

U.S. PATENT DOCUMENTS

| | | | |
|---|---|---|---|
| 2,710,929 | 6/1955 | Phelon | 310/70 A |
| 3,398,353 | 8/1968 | Noddin et al. | 123/148 CC |
| 3,447,521 | 6/1969 | Piteo | 123/148 CC |
| 3,508,116 | 4/1970 | Burson | 123/148 CC |
| 3,667,441 | 6/1972 | Cavil | 123/148 CC |
| 3,835,830 | 9/1974 | Shepherd | 123/148 CC |
| 4,036,201 | 7/1977 | Burson | 310/70 A |

FOREIGN PATENT DOCUMENTS

| | | | |
|---|---|---|---|
| 78634 | 12/1954 | Denmark | 310/70 A |

*Primary Examiner*—Mark O. Budd

*Attorney, Agent, or Firm*—Chapin, Neal & Dempsey

[57] ABSTRACT

A pole-shoe magnet group assembly for a magnetomotive device such as a magneto for the ignition system of an internal combustion engine. The group carried by the rotor includes a permanent magnet and a pair of pole-shoes extending generally circumferentially from the magnet in opposite directions. A coil/core group for electromagnetic cooperation with the pole-shoe magnet group is disposed on the stator. The inner surface of each pole-shoe is defined by a circular arc having a center eccentric to the center of rotation of the rotor. The inner surfaces of the pole-shoes and the core of the trigger coil define an air gap or spacing which varies during rotation of each shoe relative to the core. The signal induced in the trigger coil by this construction inhibits unwanted firing of a solid state switching component and in a breakerless ignition in response to reverse rotation of the magnet pole-shoe group.

3 Claims, 6 Drawing Figures

POLE-SHOE MAGNET GROUP FOR MAGNETOMOTIVE DEVICE

BACKGROUND

This invention relates generally to a pole-shoe magnet structure for a magnetomotive device and particularly to such structure for use in breakerless ignition systems for internal combustion engines.

Generally, breakerless ignition systems for internal combustion engines employ a permanent magnet rotating in synchronism with the crankshaft of the engine. In those ignition systems known as capacitor discharge (C/D) systems, the permanent magnet induces a voltage in a charging winding connected to a capacitor, and also induces a voltage in another coil of the system, generally known as a trigger coil. A solid state switching component such as a transistor or SCR, connected between the capacitor and an ignition coil, conducts periodically in response to the trigger signal whereby the capacitor charge is discharged through the primary of the ignition coil and an ignition pulse is thereby induced in the secondary winding. The voltage induced in the secondary winding which is connected to a spark plug causes the spark plug to fire. For different performance characteristics and/or economy of construction, the triggering signal may be derived from the primary winding or other available coil used in the ignition system.

In typical operation, an SCR is biased well below forward breakdown, voltage and triggering is accomplished by applying to the gate electrode current of predetermined amplitude and polarity. When used in an ignition system, a trigger coil is provided whereby an electrical pulse is generated in response to rotation of the engine shaft. The characteristics of the pulses generated by such trigger coils are important to consider in avoiding the problem of ignition system triggering in the event of reverse engine rotation. In many small engines having breakerless ignition, it has been the practice to provide special safety circuits to prevent ignition firing upon reverse engine rotation. Such circuitry contributes significantly to the cost of the ignition system.

Accordingly, it is a principal object of the present invention to provide a pole-shoe magnet group for a magnetomotive ignition system which overcomes the deficiencies of the prior art.

It is another object of the present invention to provide a pole-shoe magnet group for a magnetomotive ignition system which prevents ignition in the event of reverse rotation of the engine without the need for additional electronic components.

It is another oject of the present invention to provide a pole-shoe magnet group which generates a narrow pulse for accurate ignition timing in breakerless ignition systems.

It is another object of the present invention to provide a pole-shoe magnet group which generates rapid rise trigger pulses of essentially one polarity.

DESCRIPTION OF THE DRAWINGS

These and other objects of this invention will be more readily apparent from the following detailed description taken in connection with the accompanying drawings in which.

DESCRIPTION OF THE PREFERRED EMBODIMENT

Figure 1:
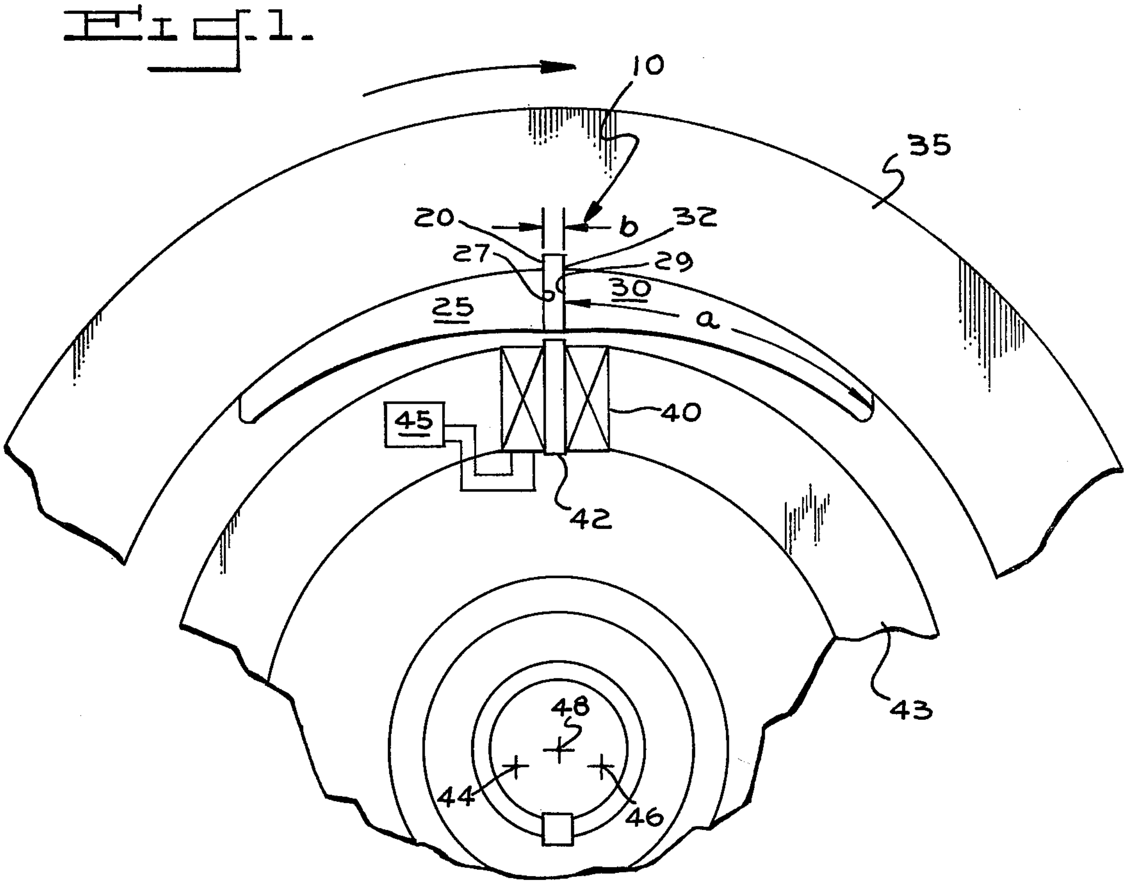
FIG. 1 is a plan view of the pole-shoe magnet group of the present invention.
Figure 2:
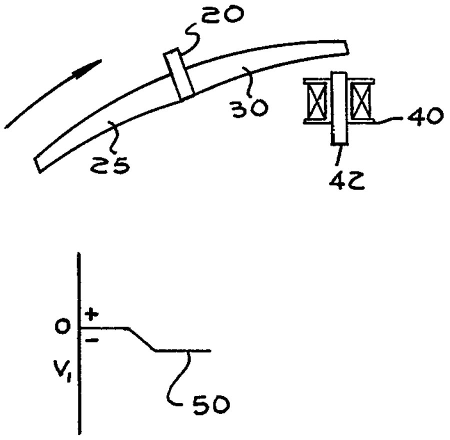
FIGS. 2–5 are simplified diagrammatical representations of the pole-shoe magnet group of the present invention in various positions of forward rotation thereof and the wave pattern induced in the trigger coil corresponding to each such position.
Figure 3:
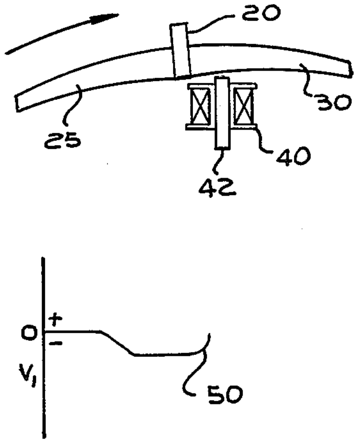

Referring to FIG. 1, the pole-shoe magnet group of the present invention is shown generally at 10. The pole-shoe magnet group comprises a high strength permanent magnet 20 and a pair of pole pieces or pole-shoes 25 and 30 extending outwardly from the magnet. For purposes of illustration, the pole-shoe magnet group is shown mounted on the flywheel 35 of an internal combustion engine rotatable in syncronism with the engine crankshaft. A trigger coil 40 disposed about a core or armature 42 is mounted on stator ring 43 and connected in circuit with an electronic ignition system represented at 45. Magnetic flux lines generated by magnet 20 are cut by coil 40 during rotation of pole-shoe magnet group 10 past core 42 causing an electrical pulse to be induced in the coil 40. This voltage pulse may be used to trigger an SCR in a breakerless ignition module 45 thereby providing a path for the discharge of a capacitor or the like through a transformer primary to effect the firing of a spark plug connected across the transformer secondary in a manner well known in the art.

Magnet 20 is formed from a high strength permanent magnet material oriented such that the poles thereof are disposed on the sides of the magnet. In the preferred embodiment the magnet is formed from samarium-cobalt or rare earth magnet but other materials capable of providing a high energy product may be employed without departing from the scope of this invention. The shape of the magnet 20 is that of a thin strip or bar disposed lengthwise in a radial direction from the center of rotation of the device whereby the magnet will be periodically registrable in radial alignment with core 42 upon rotation of the rotor.

Figure 5:
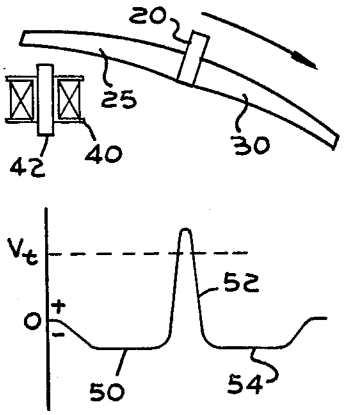

Each of the pole pieces 25 and 30, formed of a ferromagnetic material such as an alloy of steel and extends circumferentially outward from the opposite side surfaces of the magnet strip 20. The pole pieces are generally arcuate in configuration and their longest dimension a from generally flat end faces 27 and 29 being in the rotational direction of the flywheel. The inner edge surfaces of each pole-shoe are generally circular having a radius of curvature measured from points 44 and 46 eccentric with respect to the center of rotation 48 of the rotor. As a consequence of this construction, the radial distance of air gap between the core 42 of the trigger and the inner surface of each pole-shoe decreases from a position at which the outer end of the pole-shoe is opposite the core 42 to another position at which the inner end of the said pole-shoe is opposite the core 42. This circumferentially changing flux gap results in a gradual increase in the amount of flux being cut by the trigger coil whereby only a very low amplitude side pulse 50 (FIG. 5) will be generated. Because of the circumferentially elongated configuration of the pole-shoes 25 and 30, the side pulse occurs over a much larger angle of rotation of the device than the triggering pulse 52 induced in the trigger coil 40 as the magnet rotates past the core 42 of the coil. Similarly, the relative lengths of the pole-shoes to the magnet 20 produces a flux distribution pattern such that the resulting pulse 52 has an amplitude many times greater than the side pulses 50 and 54. In one embodiment of this invention, the length of the permanent magnet indicated at b in FIG. 1 was on the order of $\frac{1}{8}''$, while the width a of each pole-shoe was about 2" and the energy product of the magnet 20 is 16. Since the solid state switching element or SCR is selected to be actuated to its conductive mode by the large amplitude pulse 52, its threshold trigger voltage will inherently be substantially greater than the amplitude of the side pulses 50 and 54.

Rotor 35 is formed from a non-magnetic material such as aluminum. The pole-shoe magnet group of the present invention is fastened to the wheel in any suitable manner. In the embodiment shown, the rotor is provided with a radially extending slot 32 adapted to snugly receive the magnet 20. The pole-shoes are abutted against the side surface of the magnet and the parts are fastened in place by use of a suitable bonding agent such as an epoxy adhesive. Of course, it will be realized that any suitable fastening means may be used.

Operation of the ignition system employing the pole-shoe magnet group of the present invention is most readily appreciated from FIGS. 2–5 which illustrate sequential relative positions of the pole-shoe magnet group and trigger coil 40 as the rotor 35 is rotated. Diagrams show the voltage induced in the coil 40 for each corresponding position of the magnetomotive elements.

Figure 4:
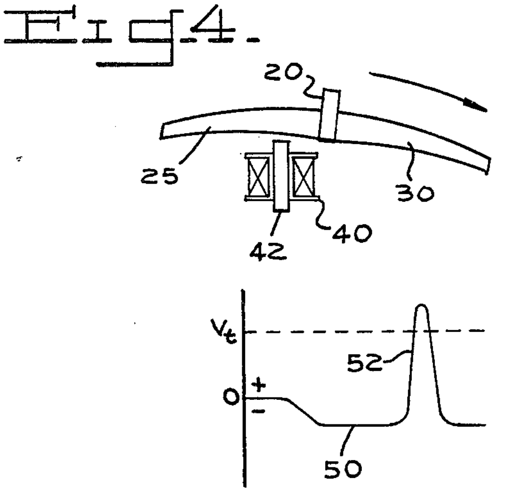

As the end of pole-shoe 30 starts to move past the trigger coil (FIG. 2) a first side pulse 50 is induced in the trigger coil 40. Because of the elongated circumferentially elongated configuration of the pole-shoes, the magnetic flux is dispersed over their length whereby only a low amplitude side pulse 50 is generated before the main pulse 52 (FIG. 4). As magnet 20 passes the trigger coil 40 the flux direction rapidly changes direction through the core 42 whereby a narrow high voltage pulse 52 is induced in the coil 40. The voltage required to trigger the breakerless ignition system is illustrated as Vt in FIG. 5. Continued rotation of the flywheel results in a second side pulse 54 of the same general shape and amplitude as the first side pulse 50. The result is that other than the main pulse 52 there are no maverick pulses or voltage spikes which are of sufficient amplitude to cause triggering of the breakerless ignition system 45.

The relative duration of the first and second pulses is determined by the relative length of the magnet 20 to the pole pieces 25 and 30 and is dictated by the ignition requirements of the engine. In the preferred embodiment the second or main pulses are of duration approximately one-tenth (1/10) that of the side pulses. Such extremely narrow main pulses makes for accurate ignition timing and stability throughout a broad range of operating speeds and the flux pattern results in pulse having an amplitude about ten (10) times the amplitude of the side pulses.

Figure 6:
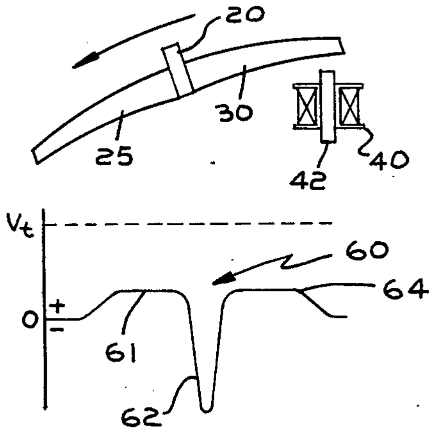
FIG. 6 is a view similar to FIG. 5 showing the pole-shoe magnet group at one position of reverse rotation together with the resulting voltage pattern.

Referring to FIG. 6, should the flywheel 35 be rotated in the reverse direction, such as where the operator spins the flywheel of a small engine in the wrong direction, voltage developed will be such as shown generally at 60 in FIG. 6. This voltage consists of two low amplitude side pulses 61 and 64 and the main pulse 62 which is of opposite polarity to the normal trigger pulse 52 generated by clockwise flywheel rotation (FIGS. 2–5). Since no portion of the voltage 60 approaches the trigger voltage Vt required to cause switching of the solid state ignition component, no ignition pulse will be generated. It will be appreciated that such reverse rotation ignition prevention is achieved solely by the configuration of magnet pole-shoe groups and requires no special protective circuitry which would add to the cost and bulk of the ignition system.

While the pole-shoe magnet group has been described in conjunction with a switching component of positive trigger voltage, it will be understood that this construction may be employed with equal utility in conjunction with a switching component of a negative trigger voltage merely by reversing the polar orientation of permanent magnet 20.

Having thus described the invention, what is claimed is:

1. Magnetomotive device for use with a breakerless ignition system including a solid state switching element comprising a trigger coil disposed on a core, means electrically connecting said trigger coil to said switching element and a pole-shoe magnet group rotatable relative to said trigger coil, said group including a high strength permanent magnet having the side surfaces thereof of opposite polarity, a pair of pole-shoes abutting said side surfaces of the magnet and extending circumferentially in opposite directions therefrom, the length of each of said pole-shoes in said circumferential directions being at least 8–10 times greater than the corresponding dimension of said permanent magnet and having a surface defined by a radius of curvature eccentric to the center of rotation of said magnet and pole-shoe group so that between said surface of each of said pole-shoes and the core of said trigger coil the air gap decreases from a position at which the outer end of the pole-shoe is opposite the core and another position at which the inner end of the same pole-shoe is opposite said core so that the flux pattern generated by said magnet is spread over substantially the length of said pole-shoes whereby upon relative rotation of the magnet group and trigger coil in one direction a trigger voltage of one polarity is generated in said coil substantially greater in amplitude than the breakdown voltage of said switching element, any other pulses induced in said coil being substantially less than said trigger voltage and said breakdown voltage, relative rotation of said magnet group and trigger coil opposite said one direction generating no voltage pulse of said one polarity having an amplitude equal to said breakdown voltage whereby said breakerless ignition system will not operate on reverse rotation of said device.

2. Magnetomotive device of claim 1 wherein said magnet is a thin strip of samarium cobalt.

3. Magnetomotive device of claim 1 wherein said magnet has an energy product of at least 16 and the amplitude of said main pulse being at least 8–10 times greater than the side pulses generated in said coil by said coil cutting lines of flux emanating over the length of said pole-shoes.

* * * * *